United States Patent [19]

Gamberg

[11] Patent Number: 4,689,461
[45] Date of Patent: Aug. 25, 1987

[54] CORED TUBULAR ELECTRODE AND METHOD FOR THE ELECTRIC-ARC CUTTING OF METALS

[75] Inventor: Edward R. Gamberg, Saverna Park, Md.

[73] Assignee: Eutectic Corporation, Flushing, N.Y.

[21] Appl. No.: 780,031

[22] Filed: Sep. 25, 1985

[51] Int. Cl.$^4$ .................. B23K 35/368; B23K 9/00
[52] U.S. Cl. .................. 219/69 R; 219/146.31; 428/629
[58] Field of Search ............. 219/69 R, 146.3, 146.31, 219/70, 72, 74, 69 E, 146.1; 148/9 C, 9.5, 26; 428/629

[56] References Cited

U.S. PATENT DOCUMENTS

| | | | |
|---|---|---|---|
| 1,953,382 | 4/1934 | Wortmann | 148/26 |
| 2,102,891 | 12/1937 | Faulkner | 219/146.31 |
| 3,345,495 | 10/1967 | Quaas et al. | 219/74 |
| 3,415,697 | 12/1968 | Bredzs et al. | 148/26 |
| 3,560,702 | 2/1971 | Arikawa et al. | 219/146.3 |
| 3,805,016 | 4/1974 | Soejima et al. | 219/146.3 |
| 3,818,178 | 6/1974 | Nakabayashi et al. | 219/146.31 |
| 3,947,655 | 3/1976 | Gonzalez et al. | 219/146.3 |
| 4,072,845 | 2/1978 | Buckingham et al. | 219/146.3 |
| 4,109,131 | 8/1978 | Schluter | 219/74 |
| 4,133,935 | 1/1979 | Dawson | 219/70 |
| 4,182,947 | 1/1980 | Brower | 219/70 |
| 4,343,984 | 8/1982 | Smith et al. | 219/146.3 |
| 4,544,139 | 10/1985 | Moore et al. | 219/69 E |
| 4,551,610 | 11/1985 | Amata | 219/146.3 |

FOREIGN PATENT DOCUMENTS

| | | | |
|---|---|---|---|
| 60-70149 | 4/1985 | Japan | 219/146.32 |
| 2136721 | 9/1984 | United Kingdom | 219/72 |

Primary Examiner—A. D. Pellinen
Assistant Examiner—Geoffrey S. Evans
Attorney, Agent, or Firm—Hopgood, Calimafde, Kalil, Blaustein & Judlowe

[57] ABSTRACT

A flux cored tubular metallic arc cutting electrode having a low carbon steel tube and a compacted core composition consisting of a particulate reactant metal such as magnesium, aluminum, zirconicum, titanicum, and alloys of at least two of the particulate reactant metals, mixed with an exothermically reactable metal oxide. Preferably the metal oxide is an iron group oxide such as iron oxide or nickel oxide. The particulate reactant metal is characterized by a free energy of formation of its oxide referred to 25° C. of at least 100,000 calories per gram atom of oxygen, the exothermically reactable metal oxide being characterized by a free energy of formation not exceeding 90,000 calories per gram atom of oxygen referred to 25° C. Additionally the electrode can contain an additive such as an arc stabilizer, a fluxing agent, a deoxidizer or a gas former.

22 Claims, 4 Drawing Figures

CORED TUBULAR ELECTRODE AND METHOD FOR THE ELECTRIC-ARC CUTTING OF METALS

This invention relates to cored tubular electrodes and to a method for the electric-arc cutting or gouging of metals.

STATE OF THE ART

It is known to cut, gouge and chamfer steel plates, and the like, at relatively high rates of speed using the heat of an electric arc. One method is the carbon arc cutting of metals using an air stream to remove the melted metal.

In air carbon arc cutting, an arc is established between a carbon-graphite electrode and the metal workpiece to be melted. A compressed air jet or jets are continuously directed to the point of melting to eject the molten metal.

Metal removal using the air carbon arc procedure is continuous as the carbon arc is advanced in the cut. The process is used for severing and gouging, the gouging being sometimes used for weld groove preparation and for the removal of a weld root or a defective weld zone.

The working end or tip of the electrode is heated to a high temperature by the arc current and does not melt. The electrode is consumed during cutting, the carbon being lost by oxidation or sublimation of the tip. Air carbon arc cutting requires an electrode holder, cutting electrodes, a power source and an air supply. The process may be carried out either manually or mechanically.

The metal workpiece or substrate is continuously heated and melted while forcibly blowing the melted metal from the cut by directing a free, high velocity stream of air along one side of the exposed surface of the working end of the electrode. Under proper operating conditions, the air stream sweeps beneath the electrode tip. The arc length should have sufficient clearance to provide continuous flow of air into the cut. The flow of air is preferably parallel to the axis of the electrode. Thus, as the stream of air passes between the electrode and the metal substrate, the force of the high velocity stream of air is sufficiently great to effectively remove the melted metal from beneath the arc and provide a uniform gouging action as the electrode is being consumed.

The arc is struck by lightly touching the electrode to the workpiece and withdrawing it to the proper distance in accordance with the arc voltage requirements. The gouging technique is different from that of arc welding in that metal is removed instead of deposited. The proper arc length is maintained by moving the electrode in the direction of the cut fast enough to keep up with metal removal.

The conventional air-assisted carbon arc gouging and cutting processes have the following inherent disadvantages: (1) the carbon arc tends to be unstable and may often create an intolerable noise level; (2) under some conditions, carbon deposits may occur at the groove, whereby a portion of the substrate at the groove is carburized which is not desirable; (3) carbon electrodes are fragile and break easily during handling; and (4) there is a great tendency for fuming to occur which causes discomfort to the worker and the surrounding areas. With regard to copper-coated carbon electrodes, copper deposits may form and adversely affect subsequent operations.

It would be desirable to provide a metal electric-arc cutting electrode which is constituted to provide a stable arc, which is self-fluxing to aid in obtaining a clean cut, which may contain vapor formers, deoxidizers and gas formers, and the like, which is capable of generating heat during cutting or gouging to augment the heat provided by the electric arc; and which does not have the attendant disadvantages of the carbon electrode.

OBJECTS OF THE INVENTION

It is an object of the invention to provide an air metal arc electrode for use in the cutting and gouging of metal.

Another object is to provide a method for cutting or gouging metal using an air metal arc electrode characterized in that it provides a stable arc, which is self fluxing during cutting and which inherently develops heat during arc cutting or gouging.

These and other objects will more clearly appear when taken in conjunction with the following disclosure, the appended claims and the accompanying drawing, wherein:

STATEMENT OF THE INVENTION

Figure 1:
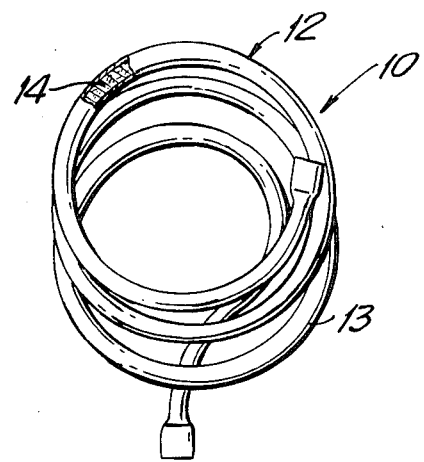
FIG. 1 is a three-dimensional view of one embodiment of the electrode in the form of a coil.

One embodiment of the invention is directed to a cored tubular metallic arc electrode for use in gas-assisted (e.g., air) cutting and gouging of metal substrates comprising a metal tube and a core composition consisting essentially of particulate reactant metal mixed with an exothermically reactable metal oxide and optionally containing 0 to about 30% by weight of material (additive) based on the total weight of the core composition, the additive being selected from the group consisting of arc stabilizers, fluxing agents, deoxidizers and gas formers. The particulate reactant metal is characterized by a free energy of formation of its oxide referred to 25° C. (298.16° K.) of at least about 100,000 calories per gram atom of oxygen, the exothermically reactable metal oxide mixed therewith being characterized by a free energy of formation thereof not exceeding about 90,000 calories per gram atom of oxygen referred to 25° C.

The core composition is preferably about 5 to 30% by weight of the total electrode, the core composition itself consisting essentially of about 10% to 70% by weight of the reactant metal, and about 90% to 30% by weight of the metal oxide, with 0 to about 20%, e.g., about ½% to 10%, by weight of an additive selected from the group consisting of arc stabilizers, fluxing agents, deoxidizers and gas formers.

Another embodiment of the invention resides in a method for the electric arc cutting or gouging of a metal substrate. The method comprises providing at least one cored tubular metallic arc electrode formed of a metal tube and a core composition consisting essentially of particulate reactant metal mixed with an exothermically reactable metal oxide and containing up to about 30% by weight of particulate material based on the total weight of the core composition, the material being selected from the group consisting of arc stabilizers, fluxing agents, deoxidizers and gas formers. As stated hereinabove, the particulate reactant metal is characterized by a free energy of formation of its oxide referred to 25° C. of at least about 100,000 calories per gram atom of oxygen, the exothermically reactable metal oxide mixed therewith being characterized by a free energy of formation thereof of not exceeding about 90,000 calories per gram atom of oxygen referred to 25° C.

The method comprises establishing an electric arc between the end of the electrode and the metal substrate to effect the cutting or gouging thereof, feeding a stream of gas, e.g., air, under pressure to the area being cut or gouged, and continuing the cutting or gouging while continually feeding the stream of gas under pressure to the area being cut or gouged.

The cored tubular metallic electrode is characterized by markedly improved gas-assisted gouging and cutting properties compared to conventional gas-assisted carbon electrodes. Unlike the carbon electrode, the metal electrode is easy to handle, and does not overheat in the manner that carbon electrode does.

The wire electrode is capable of providing a precisely controlled electric arc using DC power, preferably with positive polarity and at a constant voltage. The heat generated by the arc causes the base metal and the wire to melt locally to produce a pool of molten metal which is removed substantially instantly by an accompanying air blast, the air stream being properly focused to the area being cut or gouged.

By employing the novel wire electrode of the invention, a clean, shiny quality gouge is generally obtainable in a consistent and reproducible manner in the desired location intended by the operator. The wire electrode is capable of performing at very fast travel speed with very good accuracy. An advantage of the invention is that minimal post gouging treatment is required to prepare the gouge for subsequent operations, such as welding, painting, metal spraying, and the like.

Another advantage of the wire electrode over the carbon electrode is that the wire electrode can carry a very high current, if desirable. One diameter of wire can cover a range of currents that would require at least three or more sizes of carbon electrodes to provide the same operable current range.

The wire electrode of the invention is capable of precise gouging and cutting operations, such as removing rivets, spot welds, cutting hand holds or access panels in thin sheets, removing fillet and groove welds, cutting sheet and plate, removing attachments, removing overlays and hard surfaces, removing cracks and defects, among other uses.

DETAILS OF THE INVENTION

The invention is particularly useful in the form of continuous electrodes. Since a metal tube is used, e.g. mild steel, compared to the fragile carbon electrode, continuous metal cutting or gouging can be carried out with minimum downtime. Moreover, by optionally employing arc stabilizers, fluxing agents, gas formers, etc., a stable electric arc can be maintained for a substantial period of time until the continuous electrode is used up or interrupted after completion of cutting or gouging.

One embodiment of a continuous electrode is shown in FIG. 1 which depicts a coil 10 of a tubular metal arc electrode 12 for semi or fully automatic processes. Such an electrode may have, for example, an outside diameter ranging from about 0.025 to ⅜ inch, or preferably from about 1/16 to ⅛ inch. The wall thickness will vary according to the outside diameter. One embodiment of a cored tubing is one having an outside diameter of about 0.05 inch and a wall thickness of about 0.008 to 0.015 inch or 0.01 to 0.02 inch.

The tube 13 of the electrode may be made of mild steel, such as 1030 steel, although other wrought metals may be employed. However, low carbon steels are preferred.

Figure 2:
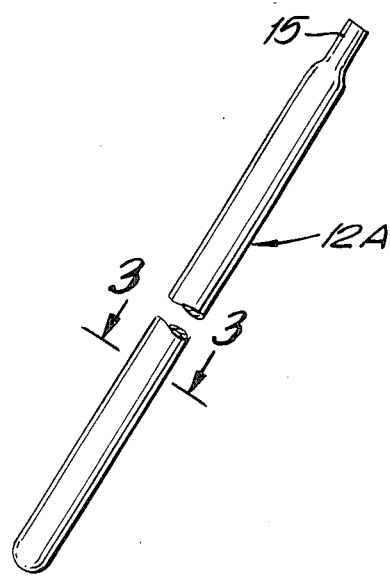
FIG. 2 is illustrative of an electrode in the shape of a rod.
Figure 3:
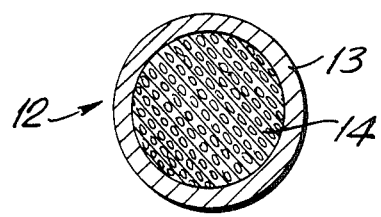
FIG. 3 is a cross section of FIG. 2 taken along line 3—3.
Figure 4:
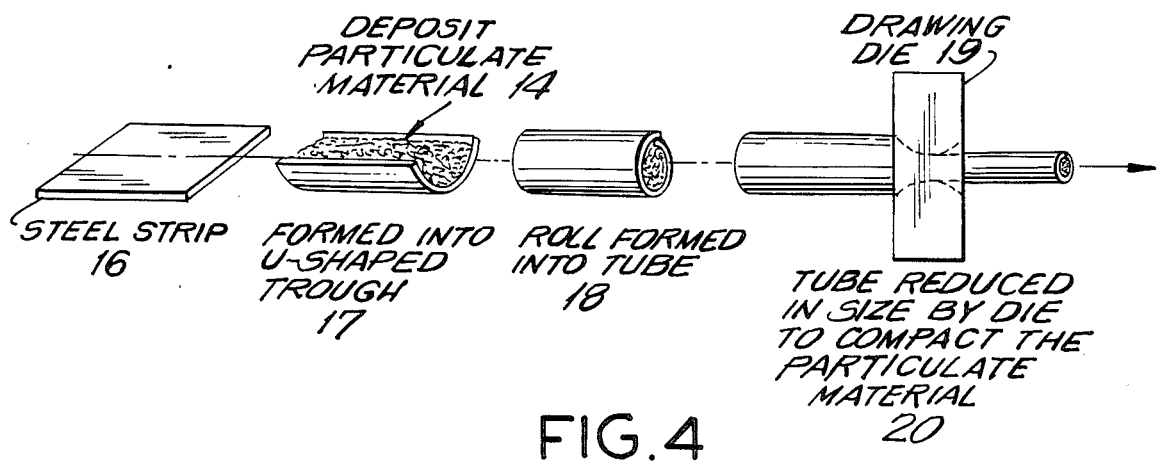
FIG. 4 is a schematic showing stepwise the production of the cored tubular electrode starting with a metal strip which is formed into a U-shaped trough to which is fed particulate core material and, which after roll-forming into a tube, is finally drawn through a die to compact the particulate material therein.

The electrode 12 may be fabricated in a stepwise fashion as shown by the schematic drawing of FIG. 4 by forming a strip of type 1030 steel 16 of about 0.012 inch thick and 0.475 inch wide into a U-shaped trough 17 by feeding it through successive forming rollers. The core material 14 is fed into the trough, and later forming stations gradually close the strip into a round tube 18. Thereafter, tube 18 is drawn to size through die 19 with the core material within it which is consolidated or compacted by virtue of the reduction in size of the tube during drawing at 20. FIG. 2 is the cross section of the completed tube.

FIG. 2 is illustrative of the cored tubular electrode of predetermined length comprising tube 12A which is similar to continuous tubular electrode 12 of FIG. 1 with the exception it is used manually in rod or stick form, the open end of the tube being pinched or closed at 15.

As stated hereinabove, the core material is comprised essentially of particulate reactant metal mixed with an exothermically reactable metal oxide and optionally containing 0 to about 30% by weight of material (additive) based on the total weight of the core composition, the material or additive being selected from the group consisting of arc stabilizers, fluxing agents, deoxidizers and gas formers. Preferably, the reactant metal in the core mixture may range by weight from about 10% to 70% (e.g., about 20% to 50% or about 25% to 35%) mixed with about 30% to 90% metal oxide (e.g., about 50% to 80%, or about 65% to 75%), and optionally 0 to about 20% of said additive.

The Reactant Metal and Metal Oxide

As previously stated, the reactant metal is one which is characterized by a free energy of formation of its oxide referred to 25° C. of at least about 100,000 calories per gram atom of oxygen. The reactant metal includes those selected from the group consisting of magnesium, aluminum, zirconium, titanium and alloys of at least two of said metals. The metal oxide may preferably be an iron-group metal oxide, e.g. iron oxide, nickel oxide, etc.

A preferred reactant metal is an alloy of Mg-Al, the alloy preferably constituting about 20% to 50% by weight of the core composition. The metal oxide may be iron oxide, e.g., $Fe_2O_3$, $Fe_3O_4$, etc. By way of example, the reactant Mg-Al alloy may comprise approximately by weight 50% Mg and 50% Al, the mixture with iron oxide comprising approximately 30% Mg-Al alloy and approximately 70% iron oxide of the core composition. In this instance, the additives are omitted, iron oxide in excess amounts being a good fluxing agent with the oxidized reactant metals.

The Additives

To assure optimum all-around performance of the electrode, at least one additive may be optionally included in the core composition such additives being selected from the group consisting of arc stabilizers, fluxing agents, deoxidizers and gas formers.

The arc stabilizers include those selected from the group consisting of alkali metal and alkaline earth metal compounds, such compounds including silicates, oxides, carbonates, etc. The carbonates are advantageous in that they are gas formers.

Fluxing agents include iron oxide, iron carbonate, $TiO_2$, $CaCO_3$, $ZrO_2$, and also the alkali metal and alkaline earth metal fluorides and silicates.

Typical deoxidizers are Si, Mg, Al, Mn, Ti and ferro alloys thereof, e.g., ferro-silicon, ferro-magnesium, ferro-aluminum, ferro-magnesium and ferro-titanium.

The gas formers may include iron carbonate, organics (e.g., cellulose), hydrated minerals (Bentonite, Fuller's Earth, mica, etc.), among others. These generate gases in the arc, such as $CO_2$ and steam, which aid in blowing the molten metal from the gouged area. Vapor formers may also be used as additives, such as ZnO, low melting fluorides, and the like.

As stated above, excess iron oxide in the core can be helpful in slagging off the Al and Mg in the core as they are oxidized to their corresponding oxides (e.g., $Al_2O_3$ and MgO).

The Cored Tubular Electrode

The tubular portion of the electrode is preferably made of wrought mild steel, such as the steels designated as 1008, 1010, 1020, 1030, 1040, 1060, 1080, otherwise referred to as carbon steel. Low carbon steel is preferred. The tubular portion of the electrode may be made of other wrought metals, available in strip form capable of being formed into a tubular electrode of sufficient mechanical strength and capable of being handled by conventional wire feeding devices.

The core composition may range by weight from about 5% to 30% (or about 8% to 20%) of the total weight of the electrode, the reactant metal preferably making up about 20% to 50% of the core composition, the metal oxide about 20% to 70% of the core composition, the balance of the core composition optionally containing 0 to about 20% or 30% by weight of additives, for example about ½% and up to about 10%.

The tubular portion of the electrode as stated herein may range in outside diameter from about 0.025 to ⅜ inch with a wall thickness of about 0.005 to 0.05 inch. A preferred electrode is one having an outside diameter ranging from about 1/16 to ⅛ inch with a wall thickness ranging from about 0.008 to 0.015 inch or about 0.01 to 0.02 inch.

Test Results

Test results using a 1/16 diameter cored wire electrode of the invention have indicated that markedly improved results can be obtained as determined by metal removal rate as a function of current input. Generally speaking there is a limit as to the amount of current that can be applied to an electrode, especially a carbon electrode, in that the total electrode tends to overheat. By using the tubular electrode of the invention in gas-enhanced gouging, the amount of current can be substantially increased with the attending advantages of markedly improved metal removal.

Tests were conducted on a 1/16 inch diameter cored electrode having the following core composition:

(1) about 29% by weight of an approximately 50/50 Mg/Al alloy in the form of a powder mixed with:

(2) about 71% by weight of $Fe_3O_4$ (mill scale).

The $Fe_3O_4$ used contained about 4% $SiO_2$ by weight of the iron oxide. The core mixture constituted about 20% of the total weight of the electrode, the steel sheath constituting about 80% by weight. The sheath was 1008 steel.

In one group of tests, the following results were obtained.

TABLE 1

AIR ENHANCED GOUGING WITH 1/16" DIAM. CORED WIRE ELECTRODE

| Test No. | Current, amp | Voltage, v | Air Pressure, psig | Metal Removal Rate, lb/hr. |
|---|---|---|---|---|
| 1 | 150 | 30 | 85–90 | 4.8 |
| 2 | 250 | 35 | 85–90 | 7.3 |
| 3 | 350 | 40 | 85–90 | 13.3 |
| 4 | 380 | 42 | 85–90 | 17.4 |

As will be noted, a substantial increase in metal removal is obtained with increase in current using the core wire electrode of the invention, while avoiding overheating of the wire electrode.

Additional tests were conducted on the 0.062 inch diameter core wire (1/16 inch) of the same core composition, except that the amount of core composition in the electrode was about 12% by weight with the mild steel sheath (1008 steel) making up the balance or about 88%. In carrying out the tests, the following variables were evaluated: (a) air presssure, (b) arc voltage, (c) wire feed speed, and (d) weight of metal removed per hour. The tests were conducted at four separate air pressures falling within the range of about 40 p.s.i. to 100 p.s.i. The results are given in Tables 2, 2A, 2B and 2C as follows:

TABLE 2

100 p.s.i. - Air Pressure
GOUGING ON MILD STEEL PLATE WITH
0.062" DIAMETER CORE WIRE OF THE INVENTION

| Test | w.f.s.* (i.p.m.) | I (amperes) | V (volts) | lbs/hr removed | Air** Pressure p.s.i. |
|---|---|---|---|---|---|
| 1 | 500 | 360 | 45 | 21.4 | 100 |
| 2 | 450 | 330 | 45 | 23.0 | 100 |
| 3 | 400 | 300 | 45 | 19.8 | 100 |
| 4 | 350 | 280 | 45 | 17.4 | 100 |
| 5 | 300 | 250 | 45 | 17.4 | 100 |
| 6 | 500 | 340 | 40 | 19 | 100 |
| 7 | 450 | 335 | 40 | 21.4 | 100 |
| 8 | 400 | 355 | 40 | 19.8 | 100 |
| 9 | 350 | 340 | 40 | 18.2 | 100 |
| 10 | 300 | 300 | 40 | 15.8 | 100 |
| 11 | 400 | 300 | 35 | 15.8 | 100 |
| 12 | 350 | 275 | 35 | 12.7 | 100 |
| 13 | 300 | 265 | 35 | 16.6 | 100 |
| 14 | 300 | 260 | 30 | 12.7 | 100 |
| 15 | 250 | 230 | 30 | 11.9 | 100 |
| 16 | 200 | 200 | 30 | 10.3 | 100 |

*w.f.s. = wire speed in inches/minute
**Pressure in lbs/in² gage

TABLE 2A 80 p.s.i. - Air Pressure
GOUGING ON MILD STEEL PLATE WITH
0.062" DIAMETER CORE WIRE OF THE INVENTION

| Test | w.f.s.* (i.p.m.) | I (amperes) | V (volts) | lbs/hr removed |
|---|---|---|---|---|
| 1 | 500 | 350 | 45 | 20.6 |
| 2 | 450 | 320 | 45 | 20.6 |
| 3 | 400 | 300 | 45 | 18.2 |
| 4 | 350 | 275 | 45 | 15.0 |
| 5 | 300 | 250 | 45 | 11.9 |
| 6 | 500 | 350 | 40 | 15.0 |
| 7 | 450 | 320 | 40 | 19.8 |
| 8 | 400 | 300 | 40 | 21.4 |
| 9 | 350 | 275 | 40 | 17.4 |
| 10 | 300 | 250 | 40 | 13.5 |
| 11 | 400 | 300 | 35 | 18.2 |
| 12 | 350 | 275 | 35 | 18.2 |
| 13 | 300 | 250 | 35 | 12.7 |
| 14 | 250 | 225 | 35 | 11.1 |
| 15 | 200 | 200 | 35 | 8.7 |
| 16 | 300 | 250 | 30 | 11.1 |
| 17 | 250 | 225 | 30 | 10.3 |
| 18 | 200 | 200 | 30 | 10.3 |

TABLE 2B 60 p.s.i. - Air Pressure
GOUGING ON MILD STEEL PLATE WITH
0.062" DIAMETER CORE WIRE OF THE INVENTION

| Test | w.f.s.* (i.p.m.) | I (amperes) | V (volts) | lbs/hr removed |
|---|---|---|---|---|
| 1 | 500 | 350 | 45 | 21.4 |
| 2 | 450 | 320 | 45 | 20.6 |
| 3 | 400 | 300 | 45 | 17.4 |
| 4 | 350 | 275 | 45 | 15.0 |
| 5 | 300 | 250 | 45 | 13.5 |
| 6 | 500 | 350 | 40 | 19.8 |
| 7 | 450 | 320 | 40 | 21.4 |
| 8 | 400 | 300 | 40 | 19.8 |
| 9 | 350 | 275 | 40 | 16.6 |
| 10 | 300 | 250 | 40 | 11.9 |
| 11 | 400 | 300 | 35 | 16.6 |
| 12 | 350 | 275 | 35 | 19.8 |
| 13 | 300 | 250 | 35 | 16.6 |
| 14 | 250 | 225 | 35 | 11.1 |
| 15 | 200 | 200 | 35 | 10.3 |

TABLE 2C 40 p.s.i. - Air Pressure
GOUGING ON MILD STEEL PLATE WITH
0.062" DIAMETER CORE WIRE OF THE INVENTION

| Test | w.f.s.* (i.p.m.) | I (amperes) | V (volts) | lbs/hr removed |
|---|---|---|---|---|
| 1 | 500 | 350 | 45 | 23 |
| 2 | 450 | 320 | 45 | 20.6 |
| 3 | 400 | 300 | 45 | 13.5 |
| 4 | 350 | 275 | 45 | 11.9 |
| 5 | 300 | 250 | 45 | 11.9 |
| 6 | 400 | 300 | 35 | 17.4 |
| 7 | 350 | 275 | 35 | 11.9 |
| 8 | 300 | 250 | 35 | 13.5 |
| 9 | 250 | 225 | 35 | 8.7 |
| 10 | 200 | 200 | 35 | 7.1 |

The foregoing tests indicate that at voltages ranging from about 35 to 45, currents ranging from about 200 to 350 amperes, and wire speeds of 200 to 450 inches per minute, optimum results are obtained as determined by the amount of metal removed (i.e., the amount of metal gouged from the steel plate) when the current ranges from about 300 to 350 ampers and wire feed speeds of about 400 to 450 inches per minute. It was observed that raising the arc voltage increased metal removal. At low air pressure, it is generally necessary to travel more slowly during gouging for effective metal removal.

At air-assisted air pressures ranging from about 40 to 100 p.s.i., optimum results are indicated at wire feed speeds of approximately 450 inches per minute and at a voltage of about 40, the amount of metal removed being in the neighborhood of about 20 to 21.5 lbs/hr. At a voltage range of about 30 to 45 volts, about 13 to 23 lbs. of metal were removed per hour. The flow of air during gouging should be properly focused.

In another group of tests, heavy single pass mild steel fillet welds on ¾ inch thick hot rolled steel plate were removed in the horizontal position using ¼ inch air-assisted carbon arc and air-assisted 1/16 inch diameter core steel electrode of the invention. The results obtained are given in Table 3.

TABLE 3

CARBON ARC GOUGING (¼ inch)

| Test No. | Length Removed | Lbs/hr Removed | Volts | Amps | Travel Speed ipm | Pressure p.s.i. | Power KW |
|---|---|---|---|---|---|---|---|
| 1 | 4 inch | N/D* | 45 | 350 | 18.5 | 60 | 15.8 |
| 2 | 6 inch | 12.0 | 40 | 600 | 16.0 | 100 | 24.0 |
| 3 | 6 inch | 3.6 | 40 | 250 | 11.0 | 100 | 10.0 |
| 4 | 6 inch | 13.0 | 40 | 550 | 17.0 | >120 | 22.0 |

1/16 Inch Cored Steel Wire (Invention)

| 5 | 6 inch | N/D* | 38 | 300 | 33.0 | 60 | 11.4 |
| 6 | 6 inch | 17.0 | 39 | 300 | 32.0 | 60 | 11.7 |
| 7 | 6 inch | 18.5 | 45 | 350 | 33.0 | 60 | 15.8 |
| 8 | 6 inch | 21.0 | 45 | 350 | 40.0 | 100 | 15.8 |

*Not determined
Travel speed of the arc during cutting is expressed in inches per minute (ipm)

The cored steel wire of the invention showed markedly improved results over the carbon electrode despite the fact that the diameter was one-quarter that of the carbon electrode. Generally, as the arc voltage increases, the noise level increases. Noisy peaks occur with carbon arc gouging whenever the operator pulls a long arc. However, with the invention, the arc length (arc voltage) is relatively constant despite operator technique and, therefore, noise level is minimal.

As shown in Table 3, the amount of metal removed using the cored steel wire was substantially greater than the amount removed by the ¼ inch carbon electrode. On average, the power consumed in kilowatts was lower for the cored steel electrode of the invention.

Very good results were obtained in the gouging of various alloys using the cored steel wire of the invention (29% 50/50 Mg/Al alloy and 71% of Fe$_3$O$_4$), the metals gouged including brazing metal deposit, stainless type 304, Hadfield steel (13% Mn), brass and aluminum.

A ⅛ inch diameter bare carbon electrode was compared to a 5/32 inch diameter copper-coated carbon electrode at 60 p.s.i. pressure. In the case of the bare electrode at an arc time of about 20 to 35 seconds, 62 to 63 volts and approximately 40 to 55 amps, the metal removal from a steel plate ranged from 1.25 to 2.85 lbs/hour. The ⅛ inch carbon heated to a bright orange (incandescent) and started to oxidize rapidly at currents in excess of 60 amperes. Thus, the current was maintained below this figure.

The copper coated 5/32 inch carbon was able to accept more current because of the increase in conductivity due to the copper coating. Thus, this electrode was able to operate at voltages from 45 to 58 and much higher amperages of 80 to 190. At amperages of 80 to 150, the rate of metal removal from a steel plate ranged from 2.43 to 9 lbs/hour, whereas, at a current of 160 to 190 (58 volts), the metal removal ranged from 11 to 13.8 lbs/hour. As above, the carbon electrode was air-assisted at 60 p.s.i.

The core steel wire electrode of the invention is superior to the copper-coated carbon electrode in that higher gouging and cutting rates are obtainable and also in that a wider range of operating parameters is permissible and practical.

A comparison made between a ¼ inch diameter carbon electrode and the 1/16 inch diameter core wire of the invention (29% 50/50 Mg/Al alloy and 71% $Fe_3O_4$) showed the electrode of the invention to be substantially better as follows in removing metal from a steel plate.

TABLE 4

| Air Assisted Electrode | Power | Metal Cutting Rate |
|---|---|---|
| Carbon | 150 amps 54 volts | 8-9 lbs/hr. |
| The Invention | 150 amps 54 volts | 10.3 lbs/hr. |
| The Invention | 200 amps 54 volts | 15 lbs/hr. |

As will be apparent from the table, the invention exhibited a higher metal cutting rate than the carbon electrode.

Examples of other electrode compositions of the invention are as follows:

TABLE 5

| The Core Composition | | The Electrode | | |
|---|---|---|---|---|
| % Reactant Metal | % Metal Oxide | % Additive | % Core | % Sheath |
| 30% Mg | 70% $Fe_2O_3$ | — | 10 | 90 |
| 15% Al | 75% $Fe_3O_4$ | 10% CaO | 15 | 85 |
| 25% Ti | 70% NiO | 5% $Na_2SiO_3$ | 30 | 70 |
| 50% Mg/Al (50/50) | 50% $Fe_3O_4$ | 5% $CaF_2$ | 8 | 92 |
| 10% Zr | 90% NiO | — | 20 | 80 |
| 20 Al | 80 $Fe_3O_4$ | — | 5 | 95 |

As stated herein before, the sheath forming the tubular electrode is preferably made by carbon steel or other ferrous metal, although other types of wrought metal can be used capable of being formed into a tubular electrode of sufficient mechanical strength and capable of being easily handled by conventional wire feeding devices.

The cored electrode of the invention can be used to cut or gouge a wide variety of metals, such as ferrous metals (e.g., steels, cast irons, ferrous alloys, etc.), aluminum, aluminum alloys, copper and copper alloys, titanium and titanium alloys, nickel-base alloys, and cobalt-base alloys.

In cutting or gouging the metals, air under pressure is directed to the area being cut to drive the molten metal away. The air may be fed at a pressure ranging from about 10 to 150 psig along the length of the electrode or as a sheath surrounding the electrode, or a plurality of streams either concentrically arranged about the electrode, or as individual streams. The air streams need not have the same focal point so long as the air stream or streams preferably have a proper flow pattern.

Although the present invention has been described in conjunction with the preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A gas-assisted metal cutting and gouging cored tubular metallic arc electrode comprising a wrought drawn metal tube with a core composition consisting essentially of particulate reactant metal mixed with an exothermically reactable metal oxide drawn and compacted therein by reduction of said metal tube, and containing 0 to about 30% by weight of an additive based on the total weight of the core composition, the additive being selected from the group consisting of arc stabilizers, fluxing agents, deoxidizers and gas formers, said core composition constitution about 5% to 30% by weight of the total electrode, the amount of reactant metal in said core consisting essentially of about 10% to 70% by weight with the metal oxide ranging from about 30% to 90% by weight, said particulate reactant metal being characterized by a free energy of formation of its oxide referred to 25° C. of at least about 100,000 calories per gram atom of oxygen, said exothermically reactable metal oxide mixed therewith being characterized by a free energy of formation thereof of not exceeding about 90,000 calories per gram atom of oxygen referred to 25° C., whereby said electrode in use during gas-assisted cutting of metal substrates provides a clean, shiny quality gouge.

2. The cored electrode of claim 1, wherein said reactant metal is selected from the group consisting of magnesium, aluminum, zirconium, titanium and alloys of at least two of said metals.

3. The cored electrode of claim 2, wherein the reactant metal is an alloy of Mg-Al, and wherein said metal oxide is an iron-group metal oxide.

4. The cored electrode of claim 3, wherein the Mg-Al alloy is about 20% to 50% by weight of core composition, and wherein the iron-group metal oxide is iron oxide ranging from about 50% to 80% by weight.

5. The cored electrode of claim 4, wherein the Mg-Al alloy is approximately 50% Mg and 50% Al, wherein the amount of alloy in the core composition is approximately 30% by weight and the amount of iron oxide is approximately 70% by weight of the core composition.

6. The cored electrode of claim 3, wherein the tubular electrode has an outside diameter of about 0.025 to ⅜ of an inch and a wall thickness of about 0.005 to 0.05 inch.

7. The electrode of claim 6, wherein the tubular electrode has an outside diameter of about 1/16 to ⅛ inch and a wall thickness of about 0.008 to 0.015 inch.

8. A gas-assisted metal cutting and gouging cored tubular metallic arc electrode comprising a wrought drawn metal tube with a core composition consisting essentially of particulate reactant metal mixed with an exothermically reactable metal oxide drawn and compacted therein by reduction of said metal tube, and containing 0 to about 30% by weight of an additive based on the total weight of said core composition, said additive being selected from the group consisting of arc stabilizers, fluxing agents, deoxidizers and gas formers, said core composition constituting about 5% to 30% by weight of the total electrode, the amount of reactant metal in said core consisting essentially of about 10% to 70% by weight with the metal oxide ranging from about 30% to 90% by weight, said particulate reactant metal being selected from the group consisting of magnesium, aluminum, zirconium, titanium and alloys of at least two of said metals, said exothermically reactable metal oxide mixed therewith being selected from iron-group metal oxides, whereby said electrode in use during gas-assisted cutting of metal substrates provides a clean, shiny quality gouge.

9. The cored electrode of claim 8, wherein the reactant metal is an alloy of Mg-Al, and wherein said metal oxide is iron oxide.

10. The cored electrode of claim 9, wherein the Mg-Al alloy is about 20% to 50% by weight of the core composition, and wherein the iron oxide ranges from about 50% to 80% by weight.

11. The cored electrode of claim 10, wherein the Mg-Al alloy is approximately 50% Mg and 50% Al, wherein the amount of alloy in the core composition is approximately 30% by weight and the iron oxide is approximately 70% by weight of the core composition.

12. The cored electrode of claim 9, wherein the tubular electrode has an outside diameter of about 0.025 to 3/8 inch and a wall thickness of about 0.005 to 0.05 inch.

13. A method for the gas-assisted electric arc cutting or gouging of a metal substrate which comprises:

providing at least one cored tubular metallic arc electrode formed of a wrought drawn metal tube with a compacted core composition consisting essentially of particulate reactant metal mixed with an exothermically reactable metal oxide drawn and compacted therein by reduction of said metal tube and containing 0 to about 30% by weight of an additive based on the total weight of the core composition, said additive being selected from the group consisting of arc stabilizers, fluxing agents, deoxidizers and gas formers, said core composition consistuting about 5% to 30% by weight of the total electrode, the amount of reactant metal in said core consisting essentially of about 10% to 70% by weight of said core with the metal oxide ranging from about 30% to 90% by weight, said particulate reactant metal being characterized by a free energy of formation of its oxide referred to 25° C. of at least about 100,000 calories per gram atom of oxygen, said exothermically reactable metal oxide mixed therewith being characterized by a free energy of formation thereof of not exceeding about 90,000 calories per gram atom of oxygen referred to 25° C., establishing an electric arc between the end of said electrode and said metal substrate to effect the cutting or gouging thereof, feeding a stream of gas under pressure to the area being cut or gouged, and continuing said cutting or gouging while continually feeding said stream of gas under pressure to said area, thereby producing a clean, shiny quality gouge.

14. The method of claim 13, wherein the stream of gas is fed under pressure along the length of the electrode to the area being cut and gouged.

15. The method of claim 13, wherein said reactant metal is selected from the group consisting of magnesium, aluminum, zirconium, titanium and alloys of at least two of said metals.

16. The method of claim 15, wherein the reactant metal is an alloy of Mg-Al, and wherein said metal oxide is an iron-group metal oxide.

17. The method of claim wherein the Mg-Al alloy is about 20% to 50% by weight of core composition, and wherein the iron-group metal oxide is iron oxide ranging from about 50% to 80% by weight.

18. The method of claim 17, wherein the Mg-Al alloy is approximately 50% Mg and 50% Al, wherein the amount of alloy in the core composition is approximately 30% by weight and the amount of iron oxide is approximately 70% by weight of the core composition.

19. The method of claim 16, wherein the tubular electrode has an outside diameter of about 0.025 to 3/8 of an inch and a wall thickness of about 0.005 to 0.05 inch.

20. The method of claim 13, wherein the gas is fed along the length of the electrode at a nozzle pressure of about 10 to 150 psig.

21. The method of claim 20, wherein the gas is fed as an annular sheath surrounding said electrode.

22. The method of claim 13, wherein the core composition constitutes about 5% to 30% by weight of the total electrode.

* * * * *